Nov. 22, 1955

M. E. HAWLEY ET AL 2,724,766

INDIRECT PANEL LIGHTING SYSTEM

Filed Sept. 19, 1952

INVENTOR
MONES E. HAWLEY
GEORGE A. SUTHER

BY

ATTORNEYS

INVENTOR
MONES E. HAWLEY
GEORGE A. SUTHER

United States Patent Office 2,724,766
Patented Nov. 22, 1955

2,724,766

INDIRECT PANEL LIGHTING SYSTEM

Mones Edgar Hawley, Haddon Township, Camden County, and George Allen Suther, Camden, N. J., assignors, by mesne assignments, to the United States of America as represented by the Secretary of the Navy Application September 19, 1952, Serial No. 310,434

2 Claims. (Cl. 240—1)

The present invention relates to illuminating devices, and more particularly to an illuminating device of the light conducting rod type.

In the construction of illuminating devices wherein particular application is to panel lighting systems, a major problem consists in illuminating objects without light shining directly into the eyes of the observer. Accordingly, an important consideration is the provision of a device wherein total reflection of all incident light is obtained with simplicity of manufacture and elimination of such inefficient expediencies as lights with hoods, reflectors, and complicated lens systems.

In accordance with the present invention there is provided a light conducting rod protruding through a panel and having an end portion for distributing light at right angles to the original direction of the light through the rod. It changes the direction of the light rays passing therethrough with a total reflection of all the incident light. The light conducting rod is simple and economical to manufacture and can be used without the use of accessory equipment such as hoods and reflectors.

Accordingly it is an object of the present invention to provide an illumination device to alter the direction of incident light by a predetermined amount.

It is a further object of the invention to provide an illumination device wherein all of the incident light is reflected to alter the direction of the incident light by a predetermned amount.

It is still another object of the invention to provide an illuminating rod so shaped that light passing through the rod parallel to the longitudinal axis of the rod will be reflected and refracted to change its direction by 90°.

Other objects and advantages of the invention will hereinafter become more fully apparent from the following description of the annexed drawings which illustrate a preferred embodiment, and wherein.

Figure 1:
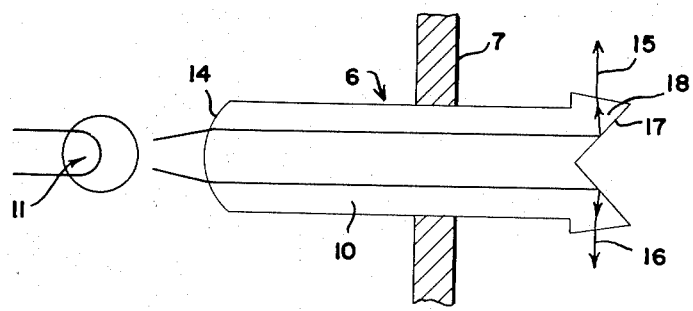
Fig. 1 is a side elevation of the light conducting rod in position within a support.

Referring now to the drawings, there is shown in Fig. 1 a light conducting rod 6 held in a suitable mounting such as an instrument panel board. The rod 6 is generally cylindrical as at 10, and is polished at end 14 to the proper radius to render parallel the light rays coming from source 11. Light rays, which are designated as 15 and 16, pass from source 11 through end 14, body portion 10, and are directed at 90° to the direction from which they came by means of reflection portion 17 and refraction portion 18.

Figure 2:
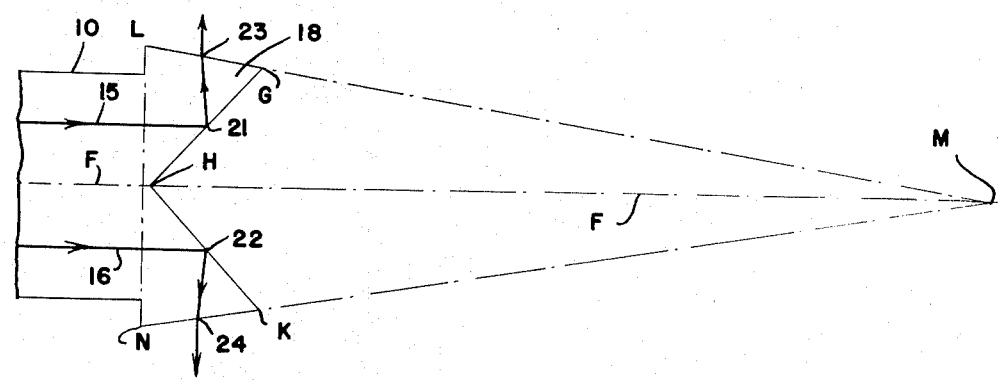
Fig. 2 is an enlarged diagrammatic view of the reflecting end of the light conducting rod with the trigonometry of the reflecting end.

As may be seen best in Fig. 2, if light rays 15 and 16 are parallel to center line FF, they will travel through the rod until they strike points 21 and 22 respectively.

The tip end of refraction portion 18 is recessed as at GHK which recess is in the form of a right circular cone having its vertex at H. The slant heights GH and KH defining reflection portion 17 are, of course, equal by definition of a right circular cone. The vertex angle GHK is chosen so that total reflection will occur at points 21 and 22.

The light rays 15 and 16 will be reflected to points 23 and 24 respectively. At these points the light rays will pass out of the rod 6 and will be refracted so that their direction is at 90° to their incident direction from light source 11 in Fig. 1. This is accomplished by proper choice of taper of slant heights LGM and NKM.

In Fig. 2 it is seen that the external periphery of end portion 18, as at LG and NK, is formed as a part of the right circular cone LMN. The vertex angle of this cone is so chosen that the desired refraction at points 23 and 24 occurs.

Figure 3:
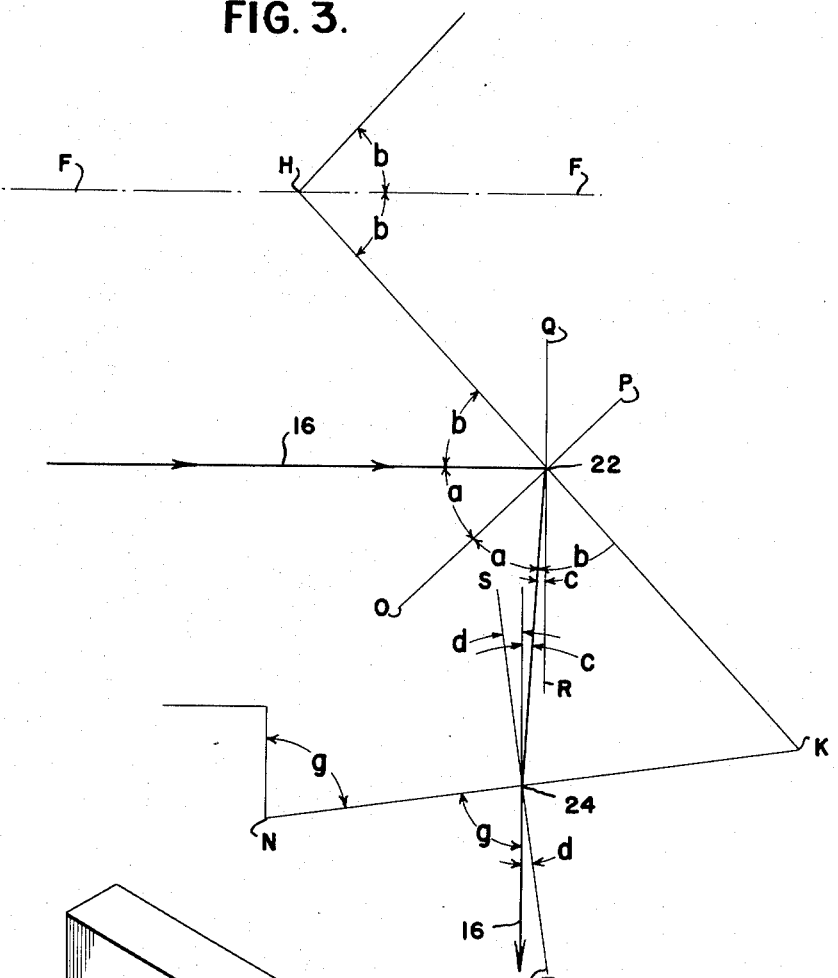
Fig. 3 is an enlarged diagrammatic view of the reflecting end of the rod with the trigonometry of the passage of light through the rod.

The trigonometry of the light passage through the rod is best explained by reference to Fig. 3. Fig. 3 shows light ray 16 striking point 22, being reflected to point 24 and there being refracted so that it leaves the rod at 90° to the original direction.

Angle $a$ is the angle of incidence of ray 16. This angle is measured with respect to the normal line OP which is perpendicular to slant height HK. Angle $b$ is the complement of angle $a$. Angle $c$ is the angle which reflected ray 16 makes with line QR which is perpendicular to the direction of incidence of ray 16. Angle $d$ is the angle made between the reverse extension of vertical line ray 16 and the line ST which is normal to slant height NK. Angle $g$ is the complement of angle $d$.

It will be noted that many of the angles in Fig. 3 are identically labelled. This has been done for ease in comprehension of the manner in which light passes through rod 6. These angles are so labelled in accordance with well known principles of geometry and physics. For example, the two angles $a$ on either side of the normal line OP are equal since the angle of incidence equals the angle of reflection. The four angles $b$ are equal since they are all equal to the complement of angle $a$ and because alternate angles formed by a line intersecting two parallel lines are equal. The two angles $c$ and the two angles $g$ are equal respectively since alternate angles formed by the intersection of a line with two parallel lines are equal. The two angles $d$ are equal since two included angles formed by the intersection of two straight lines are equal.

The mathematical computations set forth below illustrate how the vertex angles GHK and LMN may be determined for a light conducting rod of any suitable material. The computations below are based on the use of a light conducting material, methyl methacrylate, which has an index of refraction of 1.488.

Since it is desired to design the cones GHK and LMN with such vertex angles that light rays entering the body portion 10 from light source 11 will be deflected outward at 90° to the center line FF, angle $b$ is chosen so that total reflection occurs at point 22.

According to well known principles of physics, the critical angle, which must be exceeded for total reflection, is equal to the arcsin of the reciprocal of the index of refraction for the material through which the light passes. The critical angle is measured with respect to the line normal to the surface from which reflection occurs and at the point of reflection.

Referring particularly to Fig. 3, and using a light conducting rod of methyl methacrylate the following equations hold true:

Critical angle = $\angle\Theta$ $\angle\Theta = \arcsin \dfrac{1}{I.R.}$ (I. R. = index of refraction)

I. R. = 1.488 (for methyl methacrylate)

$\angle\Theta = \arcsin \dfrac{1}{1.488} = \arcsin .67204$ $\angle\Theta = 42°14'$ The rod is designed so that angle $a$ exceeds the critical angle. This will cause total reflection to occur at point 22.

If $\angle a = 43°$ $\angle b = 90 - \angle a = 90 - 43 = 47°$ $2\angle b = \angle GHK = 94°$ $\angle c = 90 - 2\angle a = 90 - 86 = 4°$ According to Snell's law, for refraction:

$I.R. = \dfrac{\sin \text{ (angle of incidence)}}{\sin \text{ (angle of refraction)}}$ At point 24, light ray 16 is refracted as it leaves the methyl methacrylate rod and passes into air.

$I.R. = \dfrac{\sin(c+d)}{\sin d}$ $\sin d (I.R.) = \sin(c+d)$ $\sin d (1.488) = \sin c \cos d + \cos c \sin d$ $\sin d (1.488) = \sin 4° \cos d + \cos 4° \sin d$ $1.488 = \sin 4° \ctn d + \cos 4°$ $1.488 = .06976 \ctn d + .99756$ $0.49044 = 0.06976 \ctn d$ $7.03 = \ctn d$ $\angle d = 8°6'$ Since $\angle g$ is the complement of $\angle d$:

$\angle g = 90 - \angle d$ $= 90 - 8°6'$ $= 81°54'$

In any triangle the sum of the three angles is 180°.

Figure 4:
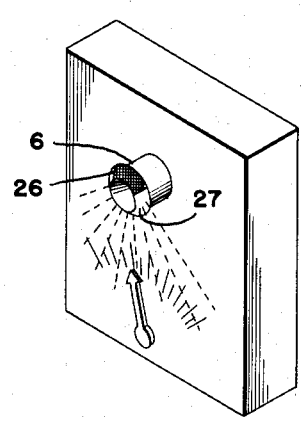
Fig. 4 is a perspective view of the light conducting rod illuminating an instrument panel.

$\angle LMN = 180 - \angle NLM - \angle LNM$ $\angle MLN = \angle LNM = \angle g = 81°54'$ $\angle LMN = 180 - 2(81°54') = 16° \mp$ It is apparent from the above computations that given the index of refraction of the light conducting rod the two vertex angles GHK and LMN may be calculated so that the direction of light rays passing along the axis of the rod 10 will be altered by 90°. This arrangement is particularly useful for illuminating an instrument panel or any plane surface. Light is conducted through the rod and dispersed in such a manner that no light strikes the eye of an observer in front of the rod. The rod may be placed in the center of an instrument panel so that light is dispersed around the entire periphery of refraction portion 18. The rod may also be used as illustrated in Fig. 4, that is with a portion 26 made opaque in order to reflect more light through a light conducting portion 27.

It should be understood, of course, that the foregoing disclosure relates to only a preferred embodiment of the invention and that numerous modifications or alterations may be made therein without departing from the spirit and the scope of the invention as set forth in the appended claims.

What is claimed and desired to be protected by Letters Patent of the United States is:

1. A cylindrical light conducting rod having a light distributing portion at one end of its longitudinal axis and a spherical surface at the other end to render parallel light rays from a light source, said portion comprising a solid formed by cutting a first cone with a second cone, the altitudes of said cones being in axial alignment, the vertex angle of said second cone being no greater than double the complement of the critical angle at which light passing through the rod is totally reflected at a surface of the rod, the vertex angle of said first cone being such that after light passing through said rod parallel to said longitudinal axis is totally reflected at the said end portion and continues through the rod, it is refracted at the conical surface of said first cone so that it is directed at right angles to the longitudinal axis of the rod.

2. An illuminating unit comprising a source of light, a transparent body having a reentrant, polished, and conical surface formed thereon, means for directing the light from said source through said body towards said conical surface in rays parallel to one another and parallel to the axis of said conical surface, the vertex angle of said conical surface being no greater than twice the complement of the critical angle at which rays of light passing through said body are totally reflected by said conical surface, and a second surface on said body lying in the path of the rays reflected by said conical surface and being at an angle to said rays which is greater than the complement of said critical angle so that said rays pass out of said body at said second surface.

References Cited in the file of this patent

UNITED STATES PATENTS

| | | |
|---|---|---|
| 1,791,794 | Chesney | Feb. 10, 1931 |
| 2,316,589 | Iwanowicz | Apr. 13, 1943 |
| 2,538,475 | Skrastin | Jan. 16, 1951 |
| 2,566,026 | Hughes | Aug. 28, 1951 |

FOREIGN PATENTS

| | | |
|---|---|---|
| 536,887 | Great Britain | May 30, 1941 |

OTHER REFERENCES

Pearson: "Piping Light With Acrylic Materials," Modern Plastics, August 1946.